April 11, 1967 H. L. POLIDAN 3,313,284
CYLINDER WALL LUBRICATION
Filed Oct. 30, 1964 3 Sheets-Sheet 3
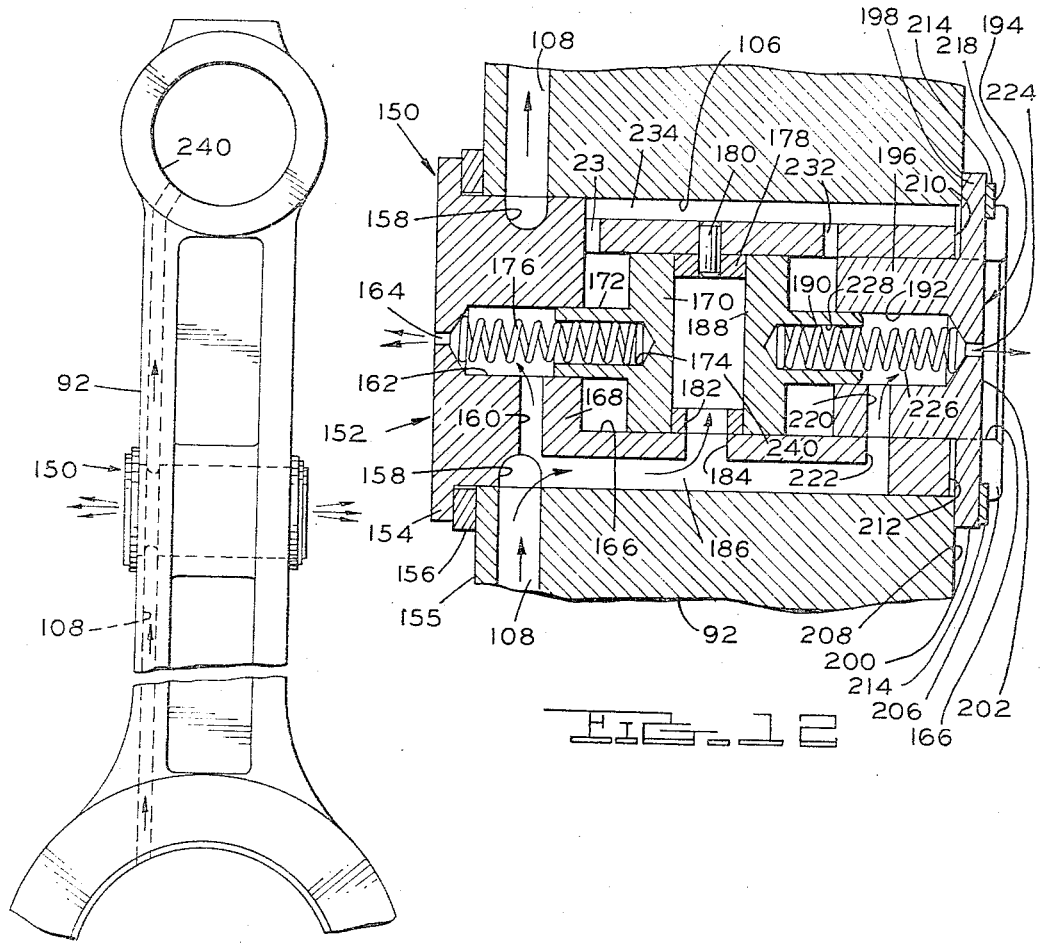
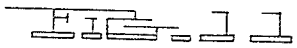
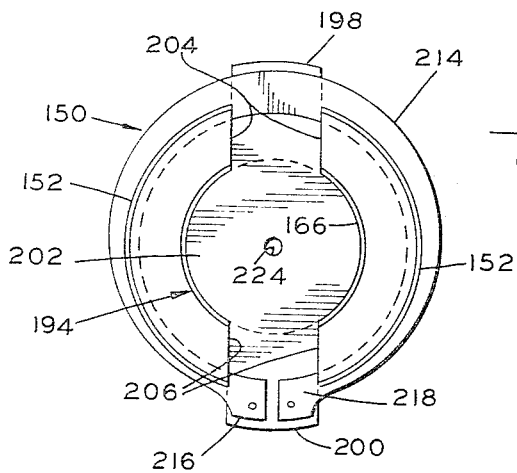
INVENTOR.
HARRY L. POLIDAN
BY
Barnes, Kisselle, Raisch, & Choate
ATTORNEYS

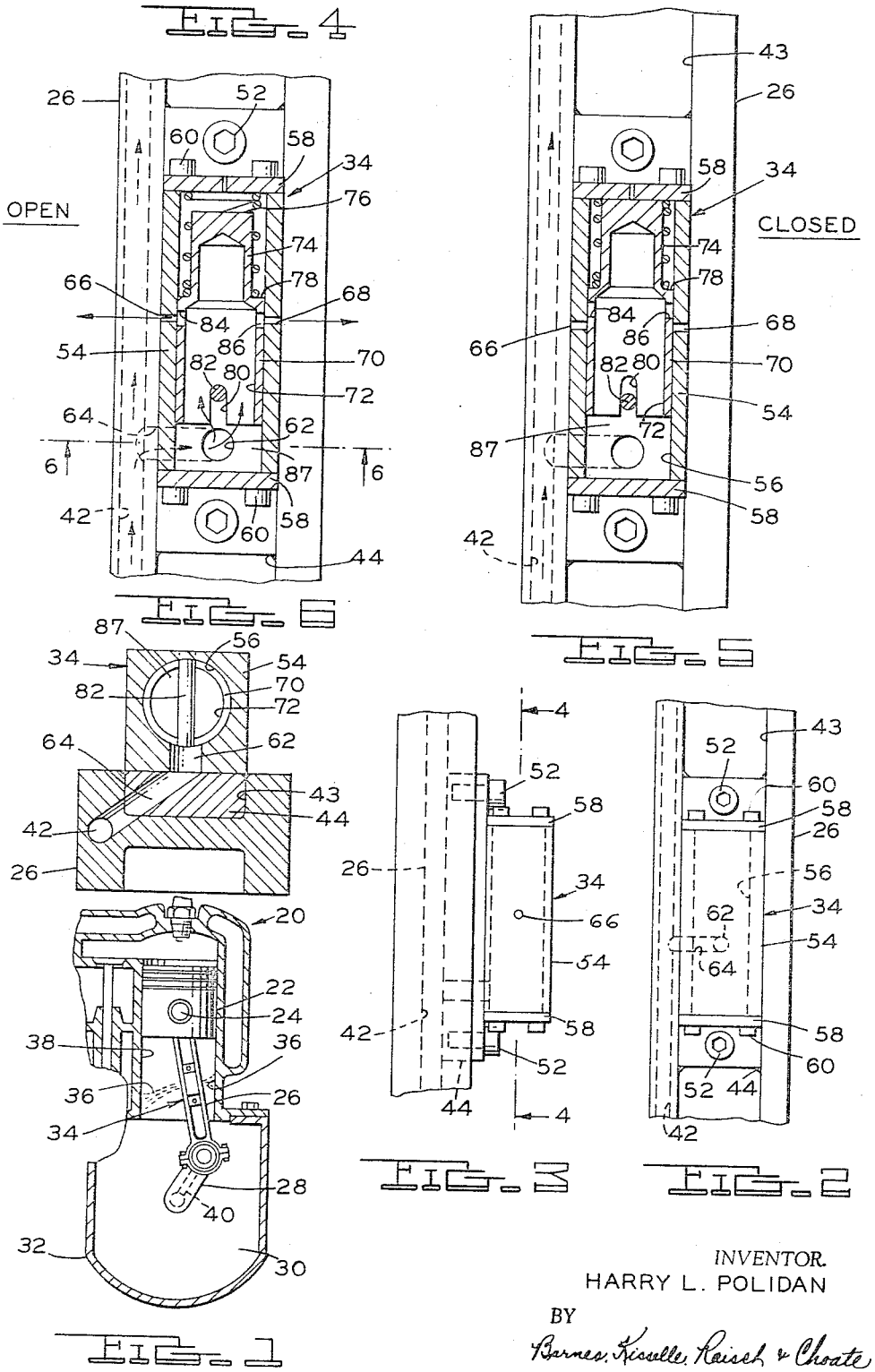

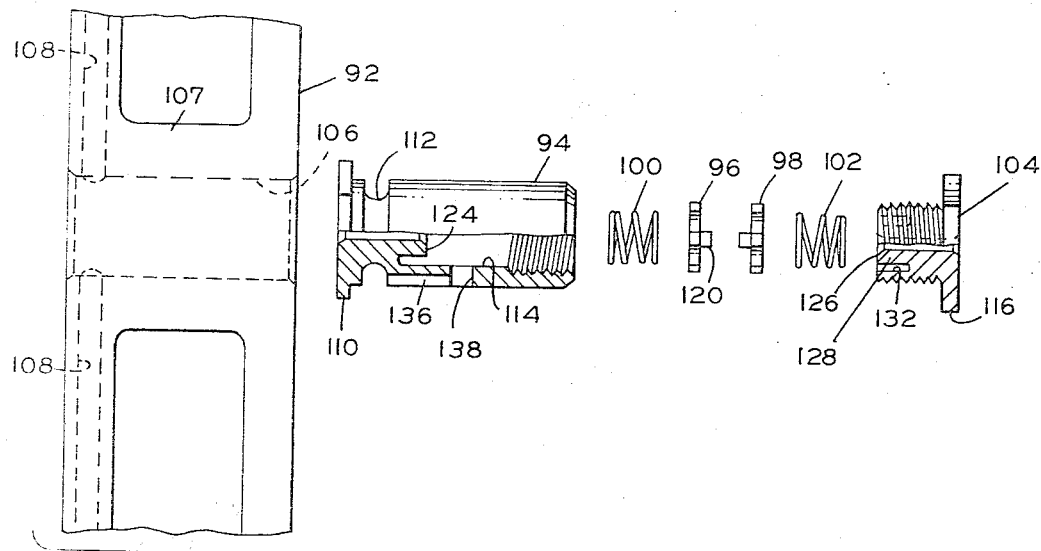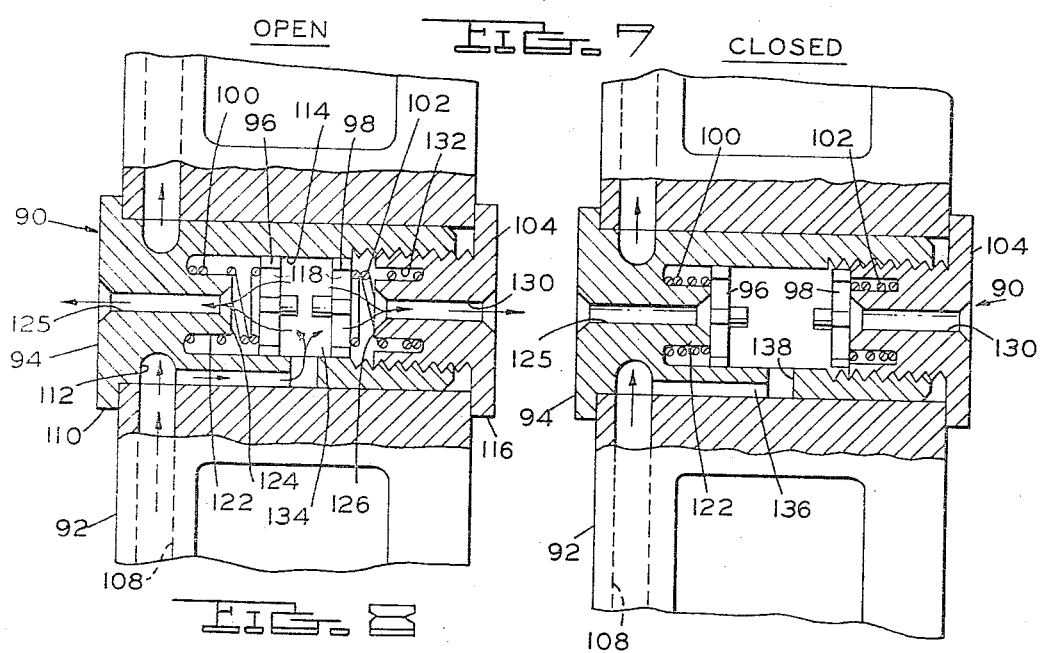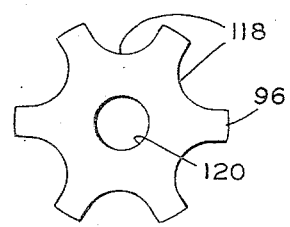

United States Patent Office 3,313,284
Patented Apr. 11, 1967

3,313,284
CYLINDER WALL LUBRICATION
Harry L. Polidan, Muskegon, Mich., assignor to Sealed Power Corporation, Muskegon, Mich., a corporation of Michigan
Filed Oct. 30, 1964, Ser. No. 407,686
10 Claims. (Cl. 123—196)

This invention relates to improvements in lubricating means and more specifically to means for lubricating a cylinder wall of reciprocating piston apparatus such as an internal combustion engine.

The present invention is concerned with the problem of inadequate cylinder wall lubrication, particularly in an internal combustion automotive engine. Many if not most engines of this type employ a force-feed lubrication system wherein oil is supplied under pressure from an oil pump via passageways in the engine crankshaft and connecting rods to the wrist pin of the piston. Other engines employ a splash system and some engines use a combination of the pressure feed and splash systems. In the splash system moving parts of the engine strike the oil in the crankcase reservoir and splash it onto the other parts exposed to the crankcase. In pressure feed systems the pump is customarily a positive displacement type and almost always is positively driven, usually from the engine camshaft either by means of gears or cams. Thus both the splash and pressure feed systems are speed responsive, i.e., the amount of throw-off from the crankshaft and likewise the output from the oil pump vary directly with engine speed.

Although lubrication requirements are ordinarily less at low engine speeds than at high engine speeds, this is not always the case, particularly at start-up when the engine may be cold, the oil sluggish and the cylinder wall drained dry of lubricating oil. Hence at low engine speeds an insufficient quantity of lubricating oil may be delivered to the parts to be lubricated, particularly to the cylinder wall which is one of the most difficult surfaces to lubricate in an engine.

An object of the present invention is to provide an improved lubricant distributing system in which a squirting device is supplied with lubricant from a force-feed lubricating system and serves to meter and distribute lubricant at a rate which varies with the operating speed of the apparatus.

A more specific object of the present invention is to provide an improved pressure-responsive valve unit for directing lubricating oil at a controlled rate onto the wall of a cylinder of an internal combustion engine to supplement normal crankshaft throw-off lubrication at low engine speeds when the force-feed system may not be adequate to supply lubricating requirements.

Another object of the present invention is to provide an improved oil squirting device of simple construction and which facilitates conversion of existing engines to the improved system of the invention.

Other objects, features and advantages of the present invention will become apparent from the following description taken in conjunction with the accompanying drawings wherein:

FIG. 1 is a fragmentary vertical section through a cylinder block and crankcase of an engine illustrating the valve unit of the invention installed on the connecting rod for squirting oil onto the wall of the cylinder in which the piston reciprocates.

FIG. 2 is a fragmentary enlarged elevational view of a valve unit and a portion of the connecting rod as shown in FIG. 1.

FIG. 3 is a side elevational view of the valve unit shown in FIG. 2.

FIG. 4 is a further enlarged vertical section taken on the line 4—4 of FIG. 3 illustrating the valve in the open, oil squirting position.

FIG. 5 is a vertical section similar to that of FIG. 4 but illustrating the valve in the closed position.

FIG. 6 is a horizontal section taken on the line 6—6 of FIG. 4.

FIG. 7 is an exploded perspective view illustrating the parts of a modified valve unit also in accordance with the present invention.

FIG. 8 is an enlarged fragmentary view partially in vertical section of the modified valve unit of FIG. 7 with its parts illustrated in the open, oil squirting condition of the valve unit.

FIG. 9 is a view similar to that of FIG. 8 but illustrating the modified valve unit with the parts in the closed position.

FIG. 10 is a further enlarged plan view of one of the valve elements employed in the modified valve unit of FIGS. 7–9.

FIG. 11 is a fragmentary elevational view of a connecting rod having a further modification of the valve unit installed therein in accordance with the present invention.

FIG. 12 is an enlarged fragmentary vertical section along the axis of the valve unit of FIG. 11.

FIG. 13 is an end elevational view of the valve unit of FIG. 11.

The present invention overcomes the aforementioned problem of inadequate cylinder wall lubrication at low engine speeds by providing a novel lubricant squirting device which is mounted in the crankcase of the engine, preferably on the connecting rod, and which is connected to the existing oil passageways of the pressure feed system so as to receive oil therefrom. The device contains a valve which is directly responsive to system oil pressure and therefore indirectly responsive to engine speed and which functions to control the flow of lubricating oil to one or more squirting ports of the device so that a proper quantity of oil is squirted from these ports directly onto the cylinder wall at the proper time to supplement normal crankshaft throw-off lubrication at low engine speeds.

Referring in more detail to the accompanying drawings, FIG. 1 illustrates in simplified form an internal combustion engine 20 having the usual piston 22 and wrist pin 24, a connecting rod 26 modified in accordance with the present invention, and a crankshaft arm 28 which upon rotation dips into a body of oil 30 in the sump of the crankcase 32 of the engine. As set forth more fully hereinafter, an improved oil squirting valve unit 34 of the present invention is secured to rod 26 and operates to squirt fine jets 36 of oil onto the wall 38 of the engine cylinder at low engine speeds. The crankshaft has an interconnecting system of oil passages 40 drilled therein to conduct the oil from the main bearings (not shown) to the connecting rod bearings, as is customary. Oil is forced through these passages by an oil pump (not shown) positively driven by the engine. Connecting rod 26 also has an oil passage 42 (FIGS. 2 and 3) extending lengthwise within it to carry oil from the connecting rod journal upwardly to the piston pin 24.

As best seen in FIG. 6, rod 26 has the conventional I-beam cross-sectional configuration and hence has a cavity 43 in each side of the connecting rod extending longitudinally between its ends. At about midway in the cavity a rectangular insert block 44 is secured to rod 26 by welding it in cavity 43 with its outer surface flush with the side faces of the rod. Valve assembly 34 is then mounted on insert 44 by cap screws 52 which are threaded into suitable tapped holes in insert 44.

Valve assembly 34 comprises a generally rectangular casing 54 having a bore 56 (FIG. 6) extending lengthwise through the casing. Bore 56 is closed at its ends by plates 58 (FIG. 4) secured by cap screws 60 to casing 54. Casing 54 has a lateral inlet port 62 (FIG. 6) which registers with a slanted branch passage 64 drilled in insert 44 and rod 26 which in turn connects with rod passage 42. A pair of discharge ports 66 and 8 (FIG. 4) are drilled in the sides of casing 54 opposite one another and are of relatively small diameter for example .046 inch, so that they form a fine jet of oil having sufficient velocity at relatively low system pressures to project from the port over onto wall 38 of the cylinder.

A valve element 70 (FIGS. 4 and 5) is slidably received with a close fit in bore 56 of casing 54. Valve 70 is a hollow generally cylindrical member with a blind bore 72 formed therein which is open at the lower end and closed at the upper end of the valve. The upper end 74 of valve 70 is reduced in diameter to receive an encircling compression coil spring 76 which butts against plate 58 at its upper end and against a shoulder 78 of valve 70 at its lower end. The lower edge of valve 70 has a pair of axial slots 80 formed therein diametrically opposite one another which receive a cross pin 82 (FIG. 6) affixed at its ends to casing 54. Pin 82 prevents valve 70 from rotating within casing 54 and serves as the lower stop to limit downward movement of the valve, as illustrated in FIG. 4. The upper limit of valve movement is determined by end 74 of the valve abutting plate 58, as illustrated in FIG. 5. Valve 70 has a pair of outlet ports 84 and 86 drilled therethrough diametrically opposite one another which register with casing ports 66 and 68 respectively when valve 70 is in its lowermost position (FIG. 4). As valve 70 moves upwardly, ports 84, 86 move out of registry with the casing ports 66, 68, thereby shutting off the flow of oil from the valve chamber 87, i.e., the chamber defined by bore 56, plate 58 and the interior of valve 70.

In operation, the above-described lubrication system is designed to squirt oil onto the walls of the cylinder when the engine is idling to thereby compensate for insufficient lubrication at such time due to low output pressure from the pump and low crankshaft r.p.m. The oil under pressure is forced via passage 40 in the crankshaft into rod passage 42 and then upwardly toward piston pin 24. Some of this oil is diverted into chamber 87 via passage 64 and inlet 62. Spring 76 is designed to bias valve 70 downwardly to the open position of FIG. 4 when the pressure of oil entering chamber 87 is below a predetermined pressure corresponding to normal system pressure in passage 42 at engine idling speed. Hence at idling speed, ports 84, 86 remain in registry with ports 66, 68, permitting oil to be squirted via ports 66, 68 in the form of streams 36 (FIG. 1) onto cylinder wall 38 to lubricate the same.

As engine speed increases, the resulting increase in pump output pressure causes an increase in the oil pressure within valve chamber 87 which forces valve 70 upwardly against the pressure of spring 76 until, at some given pressure, valve 70 has moved sufficiently to close casing ports 66, 68, thereby shutting off direct lubrication of the cylinder wall from the valve assembly. This cutoff is normally set to occur somewhere between engine idling speed and a low running speed, at which speed normal crankshaft throw-off lubrication is sufficient to lubricate the cylinder walls. As the engine slows down again to idling speed the reverse sequence occurs due to the drop in oil pressure within chamber 87, spring 76 thereupon forcing valve 70 downwardly until ports 66, 68 are reopened to discharge oil once more.

A modification of the lubrication system and valve unit of the present invention is illustrated in FIGS. 7–10 wherein a dual-valve unit 90 is mounted transversely of a modified connecting rod 92. Referring to FIG. 7, the modified valve unit 90 comprises a generally cylindrical casing 94 containing a pair of identical valve discs 96 and 98, a pair of compression coil springs 100 and 102 and a threaded nozzle 104. The modified rod 92 has a bore 106 drilled through a thickened center portion 107 of the rod from one side of the rod to the other at right angles to the longitudinal axis of the rod. Bore 106 intersects an oil passage 108 which extends lengthwise of rod 92 to carry oil from the connecting rod journal upwardly to the piston pin (not shown) at the upper end of the rod.

As shown in FIG. 8, valve unit 90 is mounted in rod 92 by inserting casing 94 into the left end of bore 106 as viewed in FIG. 8 until a hexagonal flange 110 of casing 94 abuts the left side of rod 92. In this position rod passage 108 registers with an annular groove 112 formed in the outer circumference of casing 94. Then spring 100, discs 96 and 98 and spring 102 are inserted in this order into the open (right-hand) end of a blind bore 114 in casing 94, after which nozzle 104 is screwed into the threaded end of bore 114 until its hex flange 116 abuts the right side of rod 92. Final tightening of nozzle 104 clamps the valve unit 90 tightly in place in rod 92.

As shown in FIG. 10, each disc 96, 98 has a plurality of uniformly spaced notches 118 in its periphery, and a short stud 120 projects axially from the center of one side of each disc. Discs 96, 98 are disposed transversely within bore 114 and are dimensioned to have a close sliding fit in the bore, the discs being arranged with studs 120 facing one another. Studs 120 serve as spacers to maintain a minimum separation of disc 96 from disc 98 when they are biased into mutual contact by springs 100 and 102. Spring 100 encircles a boss 122 which extends axially from the left end of bore 114. A valve seat 124 (FIG. 7) is formed on the end surface of boss 122 on which disc 96 seats as shown in FIG. 9 to thereby close a squirting passage 125 drilled through boss 122 and the left end of casing 94. Similarly, disc 98 is adapted to seat against a valve seat 126 (FIG. 7) formed on the end of a boss 128 of nozzle 104 to thereby close an oil squirting passage 130 drilled axially through nozzle 104. Spring 102 encircles boss 128 in the annular groove 132 formed in the inner end of nozzle 104.

Oil is admitted from rod passage 108 to the interior chamber 134 of casing 94 via an axial slot 136 formed in the outer circumference of casing 94 which communicates at one end with passage 108 and at the other end with an inlet port 138 extending radially between bore 114 and the outer surface of casing 94.

In operation of the modified valve unit 90, oil under pump pressure is forced via rod passage 108 upwardly toward the associated wrist pin (not shown). Some of this oil is diverted via passages 136 and 138 into chamber 134 where it enters between discs 96 and 98. The oil flow then divides as indicated by the arrows in FIG. 8, part of the oil passing through notches 118 of disc 96 and the other part through notches 118 of valve 98. The oil then flows through passages 125 and 130 respectively and emerges in the form of fine jets which are directed onto cylinder wall 38. The orifices defined between notches 118 of each disc 96, 98 and the wall of the bore 114 provide predetermined resistance to the flow of oil therethrough which tends to spread discs 96 and 98 apart toward their closed positions of FIG. 9. However, springs 100 and 102 are selected to bias discs 96 and 98 toward one another to maintain them in open position as shown in FIG. 8 when the pressure of oil entering chamber 134 is below a predetermined pressure corresponding to normal system pressure at engine idling speed.

As engine speed increases, the resulting increase in pump output pressure increases the oil pressure in chamber 134 and the velocity of the oil bypassing discs 96 and 98, thereby increasing the forces tending to spread the discs apart. At some given pressure corresponding to a predetermined engine speed higher than engine idling speed, the pressure is sufficient to cause discs 96 and 98 to abut seats 124 and 126 respectively, thus closing passages 125 and 130 and thereby shutting off direct lubrication of the cylinder wall from valve assembly 90. At this speed normal crankshaft throw-off is sufficient to lubricate the cylinder walls. As the engine slows down again to idling speed the reverse sequence occurs due to the drop in oil pressure in chamber 134, springs 100 and 102 thereupon respectively forcing discs 96 and 98 off their seats to reopen passages 125 and 130.

FIGS. 11, 12 and 13 illustrate a further modification of the oil squirting device of the present invention which, like valve unit 90 of FIG. 7–10, comprises a dual-valve unit 150 which is mounted in rod bore 106 transversely of connecting rod 92. As best seen in FIGS. 12 and 13, valve unit 150 comprises a cylindrical casing 152 dimensioned to be received with a close sliding fit in bore 106 and to protrude from both ends of the bore. As viewed in FIG. 12, the left hand end of casing 152 has an annular flange 154 which extends radially outwardly therefrom to overlap the end face 155 of rod 92. A sealing washer 156 encircles casing 152 between flange 154 and rod 92. Casing 152 has an annular external groove 158 which registers with rod passage 108, and a radial passage 160 leading from groove 158 upwardly into an axial bore 162 in casing 152. A restricted orifice 164 communicates with the left end of bore 162 and extends coaxially therefrom to the outer face of casing 152 to form an oil squirting passage. The right end of bore 162 opens into a larger coaxial bore 166 at radial face 168, bore 166 extending axially of casing 152 and being open at the right hand end of the casing. A valve piston 170 is slidably disposed in bore 166 and has a cylindrical axial extension 172 slidably received in bore 162 with a fluid sealing fit to serve as a spool valve for opening and closing communication between passage 160 and bore 162. Extension 172 has a blind bore 174 which receives one end of a compression coil spring 176 which butts against the ends of bores 162 and 174 to normally urge piston 170 to its open position against one end of a spacer ring 178. Ring 178 is secured in bore 166 by a pin 180 and has a port 182 diametrically opposite pin 180 which registers with a radial port 184 in casing 152. An axially extending groove 186 in the outer circumference of casing 152 connects circumferential groove 158 with port 184.

A second valve piston 188 is slidably disposed in bore 166 of casing 152 on the other side of spacer ring 178. Piston 188 has an axial extension 190 which is slidably received with a fluid seal in a bore 192 of a nozzle 194. Nozzle 194 has a cylindrical portion 196 which is received with a close fit in the open end of casing bore 166. As best seen in FIG. 13, nozzle 194 also has a pair of arms 198 and 200 which extend radially outwardly from cylindrical portion 196 diametrically opposite one another flush with the end face 202 of nozzle 194. Arms 198 and 200 are respectively received in radial slots 204 and 206 which are formed in the open end of casing 152 and which terminate at end faces 210 and 212 respectively (FIG. 12) disposed inwardly of the plane of the end face 208 of rod 92.

After nozzle 194 is inserted in bore 166, a snap ring 214 having a pair of parted ends 216 and 218 (FIG. 13) is inserted in a circumferential groove 218 formed in casing 152 adjacent the right end thereof. Snap ring 214 overlaps nozzle arms 198 and 200 which in turn overlap end face 208 of the rod to thereby axially secure nozzle 194 in casing 152, valve unit 150 being held fixed against axial movement in rod 92 by the arms 198, 200 and snap ring 218 at one end of casing 152 and by flange 154 and the associated washer 156 at the other end of the casing. Also, the engagement of arms 198 and 200 in their respective casing slots 204 and 206 prevents rotation of nozzle 194 relative to the casing and serves to locate a radial passage 220 of nozzle 194 in registry with a radial passage 222 in casing 152. Passage 222 communicates with one end of the groove 186 and passage 220 with bore 192 to thereby conduct oil from rod passage 108 to the bore. A restricted orifice 224 in the outer end of nozzle 194 communicates with bore 192 to thereby provide an oil squirting passage aimed in the opposite direction from passage 164.

Piston 188 is biased toward piston 170 by a compression coil spring 226 which butts against the end of bore 192 and the end of a bore 228 in valve extension 190. A pair of radial venting ports 230 and 232 connect the space behind pistons 170 and 188 with an axially extending groove 234 formed in the outer periphery of casing 152 which leads to the upper groove 204 of the casing and thence to atmosphere via the clearance space between arm 198 and groove 204.

In the operation of the modified valve unit 150, lubricating oil under engine pump pressure is forced upwardly in rod passage 108 toward the wrist pin bore 240 of rod 92 (FIG. 11). Some of this oil is diverted via groove 186 into the radial passages 160, 184 and 222 of casing 152. The oil flowing up passages 160 and 222 enters bores 162 and 192 and then is discharged via orifices 164 and 224 in the form of fine streams or jets of oil that are directed onto the cylinder wall of the engine. The oil which is diverted from groove 186 via ports 184 and 182 fills the piston chamber 240 formed between valve pistons 170 and 188 and is at substantially the same pressure as the oil in rod passage 108. Due to the greater working area of pistons 170 and 188 exposed to oil pressure in chamber 240 compared to that of the spool valve extensions 172 and 190 exposed to the same oil pressure in bores 162 and 192, the net force on pistons 170 and 188 resulting from oil pressure is always in a direction tending to spread the pistons apart. However, springs 176 and 226 are selected to bias pistons 170 and 188 toward one another and maintain them in their respective open positions as shown in FIG. 12 when the pressure of oil entering chamber 240 is below a predetermined pressure to thereby permit the oil squirting action at engine idling speed.

As engine speed increases, pump output pressure also increases, thereby increasing the oil pressure in chamber 240. At some given pressure corresponding to a predetermined engine speed higher than engine idling speed, the pressure in chamber 240 is sufficient to move pistons 170 and 188 far enough apart so that their respective spools 172 and 190 cover passages 160 and 220 to thereby close communication between rod passage 108 and discharge ports 164 and 224, thus shutting off direct lubrication of the cylinder wall from the valve assembly 150. At this speed normal crankshaft throw-off is sufficient to lubricate the cylinder walls. When the engine slows down again to idling speed, the reverse sequence occurs due to the reduction in oil pressure in rod passage 108 and hence in chamber 240, springs 176 and 192 thereupon respectively forcing the pistons 170 and 188 back toward spacer 178 to reopen passages 160 and 220 so that oil is once again squirted from discharge ports 164 and 224.

I claim:

1. In an internal combustion engine having a cylinder, a piston reciprocable in the cylinder, a crankshaft and a rod connecting the piston and crankshaft so that rotation of the crankshaft reciprocates the piston in the cylinder, said rod and crankshaft having interconnecting oil conducting passageways, said engine further having an oil pump driven by the engine at a rate which varies directly with engine speed and communicating with said passageways, the combination therewith of a casing supported on said rod and having a chamber communicating with said rod passageway, a valve exposed to oil in said chamber and movable in said casing in response to a change in the pressure of oil admitted to the chamber and means biasing said valve against the force of chamber oil pressure acting on said valve, said casing having a port controlled by said valve and communicating when said port is open with the rod passageway for directing oil under pressure toward the cylinder wall, said biasing means yielding in response to a predetermined oil pressure acting on said valve corresponding to a given engine speed so that said valve controls discharge of oil via said port as a function of engine speed.

2. The combination set forth in claim 1 wherein said valve moves in a direction parallel to the longitudinal axis of said connecting rod.

3. The combination set forth in claim 1 wherein said valve moves in a direction perpendicular to the longitudinal axis of said connecting rod.

4. The combination set forth in claim 1 wherein said casing has a second port communicating with said rod passageway, said ports being oriented to direct oil streams toward opposite sides of the cylinder, said valve being adapted to control both of said ports simultaneously.

5. The combination set forth in claim 1 wherein said casing has a second port communicating with said rod passageway for directing oil under pressure toward the cylinder wall, and further including a second valve and associated biasing means disposed in said casing for controlling said second port, said biasing means being arranged to bias said first and second valves to open position relative to their respective ports, and passage means connecting said rod passageway with said chamber for supplying oil to the sides of said valves remote from said ports and to the associated port under the control of said valves.

6. In combination, a connecting rod adapted to connect the crankshaft of an engine with a piston therein, said rod having an oil conducting passage extending longitudinally thereof adapted to supply oil from a crankshaft oil passage system to the piston and further having a bore extending transversely through the rod from one side thereof to an opposite side thereof and intersecting said rod passage, and a valve assembly comprising a casing disposed coaxially in said rod bore with one end of said casing having retaining means overlapping said one side of the rod, said casing having a bore open at the end of said casing opposite said one end thereof and extending axially into the casing, a nozzle received in the open end of said casing bore having retaining means overlapping said opposite side of the rod, means detachably securing said nozzle to said casing such that said retaining means abut their respectively overlapped rod sides to thereby secure said valve assembly in said rod, first and second valve members disposed in said casing bore for axial movement therein, means for spacing said valve members apart to thereby define a pressure fluid chamber in said casing bore between said valve members, said casing and nozzle having passage means communicating with said rod passage and including first and second oil squirting ports in said one end of said casing and in said nozzle respectively opening outwardly thereof and a passage connecting said chamber in constant communication with said rod passage, said first and second valve members being operably interposed in said passage means between said rod passage and said first and second ports respectively to control communication between said rod passage and said first and second ports respectively, and spring means disposed in said casing urging said valve members toward one another against the pressure of oil in said chamber to open communication to said oil squirting ports and yielding to permit said valve members to move apart in response to a predetermined oil pressure in said chamber to thereby close communication to said ports.

7. The combination set forth in claim 6 wherein said valve members each comprise a piston slidably disposed in said casing bore and defining a movable wall of said chamber and a spool valve operably connected to the piston on the side thereof remote from said chamber, said passage means comprising a spool bore in said casing slidably receiving in one end thereof the spool valve of said first valve member and communicating at the other end thereof with said first port, a spool bore in said nozzle slidably receiving in one end thereof the spool valve of said second valve member and communicating at the other end thereof with said second port and first and second inlet ports opening respectively into the walls of said first and second spool bores between the limits of travel of the respective spool valves therein and communicating with said rod passage.

8. The combination set forth in claim 6 wherein said first and second valve members comprise first and second discs respectively slidably disposed for axial movement in said casing bore and each defining a movable wall of said chamber, each of said discs having a plurality of perforations connecting said chamber with said casing bore on the side of said disc remote from said chamber, said casing and nozzle each having a valve seat disposed in said casing bore respectively between said first and second discs and said first and second ports adapted to respectively receive said first and second discs thereagainst for closing communication between said chamber and said first and second ports respectively.

9. A valve assembly comprising a casing having a bore therein and a discharge port in one side of the casing extending between the bore and exterior of the casing, means for closing one end of said bore, a valve slidable in said bore for opening and closing said discharge port, an inlet port in said casing communicating with said bore between the valve and said closed end of the bore and means biasing the valve toward said closed end of the bore to normally maintain the valve in open position relative to said discharge port, said valve being movable to closed position by an increase in the pressure of oil admitted via said inlet port to the bore, said casing bore being cylindrical and said valve comprising a hollow cylindrical body open at one end and closed at the other end and having a reduced diameter portion at the closed end thereof spaced from the casing bore, said biasing means comprising a coil spring encircling said reduced diameter portion and acting to bias the valve toward said closed end of said casing bore, said body having a port extending radially therethrough adapted to register with the casing discharge port in the open position of said valve, said body having a slot in its side extending axially thereof and terminating at one end in the body, said casing having a pin fixed thereto and extending radially into said bore and slidably received in the slot of the body to prevent rotation of the body relative to the casing, said pin being located in said casing to abut said body at said one end of the slot in the open position of the valve.

10. A lubrication system for lubricating a surface in an internal combustion engine comprising means forming a passageway in the engine and a discharge port connected to said passageway adapted to direct liquid lubricant conducted to said port from said passageway at the surface to be lubricated, means for supplying liquid lubricant to said port via said passageway at a pressure which varies directly with engine speed, a valve member disposed for controlling flow of the lubricant in said passageway to said port and movable by the pressure of the lubricant in said passageway toward a position which closes communication between said port and said lubricant supply means and means yieldably biasing said valve toward a position which opens communication between said port and said lubricant supply means whereby variations in the pressure of lubricant supplied to said passageway by said lubricant supply means causes said valve member to regulate discharge of lubricant from said passageway via said port onto the surface to be lubricated at a rate inversely proportional to engine speed.

References Cited by the Examiner

UNITED STATES PATENTS

| | | | |
|---|---|---|---|
| 294,334 | 2/1884 | Reed et al. | 137—517 |
| 1,584,897 | 5/1926 | Skinner et al. | 184—18 |
| 2,050,672 | 8/1936 | Simon | 137—517 X |
| 2,375,612 | 5/1945 | Barr | 184—18 X |

LAVERNE D. GEIGER, *Primary Examiner.*

H. S. BELL, *Assistant Examiner.*